(12) United States Patent
Files et al.

(10) Patent No.: US 10,312,719 B2
(45) Date of Patent: Jun. 4, 2019

(54) WIRELESSLY TRANSMITTING POWER FROM A FIRST TRANSCEIVER TO A SECOND TRANSCEIVER IN A COMPUTING DEVICE USING PIVOTING HINGES

(71) Applicant: Dell Products L. P., Round Rock, TX (US)

(72) Inventors: Jace W. Files, Round Rock, TX (US); John Trevor Morrison, Round Rock, TX (US); Gerald R. Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 285 days.

(21) Appl. No.: 15/403,387

(22) Filed: Jan. 11, 2017

(65) Prior Publication Data
US 2018/0198308 A1      Jul. 12, 2018

(51) Int. Cl.
| | |
|---|---|
| *H01M 10/44* | (2006.01) |
| *H01M 10/46* | (2006.01) |
| *H02J 7/02* | (2016.01) |
| *H04B 5/00* | (2006.01) |
| *H02J 50/40* | (2016.01) |
| *H02J 50/12* | (2016.01) |
| *G06F 1/16* | (2006.01) |
| *G06F 1/26* | (2006.01) |

(52) U.S. Cl.
CPC ............ *H02J 7/025* (2013.01); *G06F 1/1618* (2013.01); *G06F 1/1647* (2013.01); *G06F 1/1681* (2013.01); *G06F 1/1683* (2013.01); *G06F 1/266* (2013.01); *H02J 50/12* (2016.02); *H02J 50/40* (2016.02); *H04B 5/0037* (2013.01)

(58) Field of Classification Search
USPC .................... 320/107, 108, 114, 115, 104
See application file for complete search history.

(56) References Cited

U.S. PATENT DOCUMENTS

| | | | | | |
|---|---|---|---|---|---|
| 5,175,672 | A | * | 12/1992 | Conner ................. | G06F 1/1616 361/679.09 |
| 2013/0063873 | A1 | * | 3/2013 | Wodrich .............. | G06F 1/1635 361/679.01 |
| 2014/0028251 | A1 | * | 1/2014 | Jenwatanavet ......... | H01F 27/36 320/108 |
| 2015/0291073 | A1 | * | 10/2015 | Pajic ...................... | A47B 23/00 320/108 |

* cited by examiner

*Primary Examiner* — Edward Tso
(74) *Attorney, Agent, or Firm* — Campbell Stephenson LLP; Shiv S. Naimpally

(57) ABSTRACT

A computing device may include a first housing attached to a second housing by one or more hinges. A second power transceiver in the second housing may receive power from a power source and wirelessly transmit the power to a first power transceiver in the first housing. The first power transceiver may distribute the power to a first display device and to a computer motherboard located in the first housing. The first power transceiver may include first magnets positioned to attract second magnets in the second power transceiver. Each power transceiver may include a bearing on either end that enables each power transceiver to rotate, such that a first coil of the first power transceiver is in a line of sight of a second coil of the second power transceiver, regardless of an orientation of the computing device.

20 Claims, 10 Drawing Sheets

WIRELESSLY TRANSMITTING POWER FROM A FIRST TRANSCEIVER TO A SECOND TRANSCEIVER IN A COMPUTING DEVICE USING PIVOTING HINGES

BACKGROUND OF THE INVENTION

Field of the Invention

This invention relates generally to computing devices and, more particularly, to wirelessly transmitting power from a first housing of a computing device to a second housing of the computing device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a tablet computing device that has two display devices, e.g., a dual-display computing device, the various components of the computing device may be located behind the display devices. Multiple wires (e.g., cables) may be run between the components to connect the components to each other. For example, power cables may provide power from a battery (or an external power source such as an alternating current (AC) adapter) to each component of the dual-display computing device that uses power. However, running power cables between the two display devices may create concerns that repeatedly flexing the cable could cause the power cable to fray or break. Frayed or broken cables could cause undesirable issues, such as causing the computing device to fail, destroying internal components, or delivering an electrical shock to a user.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

A computing device may include a first housing attached to a second housing by one or more hinges. A second power transceiver in the second housing may receive power from a power source (e.g., a battery or an external power source) and wirelessly transmit the power to a first power transceiver in the first housing. The first power transceiver may distribute the power to a first display device and to a computer motherboard located in the first housing. The first power transceiver may include a first set of magnets positioned to attract a second set of magnets in the second power transceiver. Each power transceiver may include a bearing on either end that enables each power transceiver to rotate, such that a first coil of the first power transceiver is in a line of sight of a second coil of the second power transceiver, regardless of changes to an orientation of the computing device.

BRIEF DESCRIPTION OF THE DRAWINGS

A more complete understanding of the present disclosure may be obtained by reference to the following Detailed Description when taken in conjunction with the accompanying Drawings. In the FIG.s, the left-most digit(s) of a reference number identifies the FIG. in which the reference number first appears. The same reference numbers in different FIG.s indicate similar or identical items.

DETAILED DESCRIPTION

Figure 1:
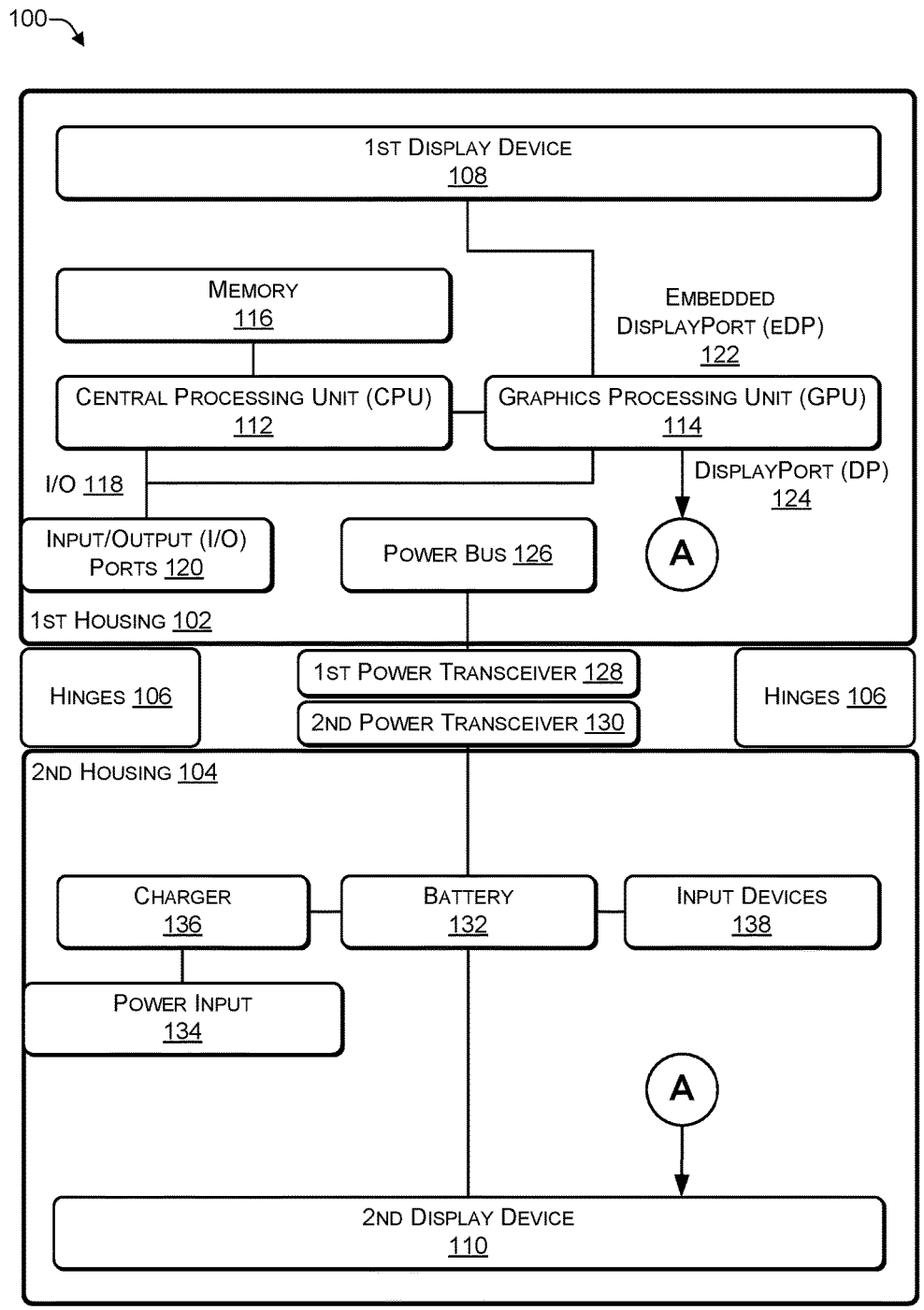
FIG. 1 is a block diagram of an architecture of a computing device that includes two wireless power transceivers according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may wirelessly transmit power from one side of a computing device to another side of a dual-display computing device. For example, the dual-display computing device may include a first display device coupled to a second display device using one or more hinges. Some of the components of the computing device, such as a motherboard, one or more ports, and the like, may be located behind (and share the same housing as) the first display device. The remaining components of the computing device, such as a power source (e.g., a battery, a battery charger, an external power adapter, and the like), may be located behind (and share the same housing as) the second display device.

Power may be wirelessly distributed (e.g., routed) between the first display device and the second display device using two power transceivers. For example, a first power transceiver may be located at a first edge of the first display and may wirelessly transmit (or receive) power to (or from) a second power transceiver located at a second edge of the second display.

The power transceivers may use an extremely high frequency (EHF) to transmit and receive power. The power transceivers may use inductive wireless charging (e.g., tightly coupled technology) or resonant wireless charging (e.g., loosely coupled technology). For example, the EHF may be between approximately 100 kilohertz (KHz) to— approximately 300 KHz (for inductive charging) or between approximately 5 Megahertz (MHz) to 8 MHz (for resonant charging). In some cases, 6.78 MHz may be used for resonant charging. These frequencies may be used to transport electrical-based protocols (e.g., power) over a short distance (e.g., 20 millimeters (mm) or less) through plastics and air. By using EHF, mechanical failures from the wear-and-tear of repeatedly flexing power cables that run from the first display device to the second display device may be avoided. In addition, the use of EHF may reduce (or eliminate) radio frequency interference (RFI) and electro-magnetic interference (EMI) as compared to using cables, because EHF is at a much higher frequency than other frequencies used in the computing device (e.g., 60 Hz alternating current (AC), 480 megabits per second (MBps) for USB 2.0, 5 gigabits per second (GBps) for USB 3.0, and the like). The power transceivers may be relatively small, e.g., approximately the size of a coffee bean. Power consumption to transmit the power wirelessly between the two display devices may be relatively low. For example, using the power transceivers to transmit power may consume no more than approximately 5% power as compared to using cables to transmit power.

Each of the power transceivers may use a coil to transmit power, to receive power, or both. Both ends of each power transceiver may include a bearing that enables the power transceivers to rotate (e.g., relative to each other and relative to the computing device). Each power transceiver may include a set of one or more magnets. A first set of magnets on a first power transceiver may interact with a second set of magnets on the second power transceiver to keep the power transceivers in a particular position relative to each other. For example, the first set of magnets may be placed in the first power transceiver with a particular polarity and may face the second set of magnets having an opposite polarity placed in the second power transceiver. The attraction of the two sets of magnets with opposite polarities and the rotational freedom provided by the bearings may cause the first power transceiver to be positioned in a particular position (e.g., with the coils facing each other) with respect to the second power transceiver, regardless of an orientation (e.g., vertical orientation or horizontal orientation) of the computing device. To illustrate, the magnets and bearings may cause the coils to face each other independent of the orientation of the computing device and independent of the angle between the two display devices. The magnets and bearings may enable the coils to remain within a line of sight of each other and within a predetermined distance (e.g., 20 mm or less) from each other. In this way, power may be transmitted from one side of the computing device to another side of the computing device in any orientation that a user places the computing device.

Thus, a dual-display computing device may locate the various components of the computing device behind either of the two display devices. For example, the power components (e.g., battery, battery charger, power adapter, and the like) may be located behind a first display device and the remaining components (e.g., motherboard and the like) may be located behind a second display device. Power may be transmitted from the first side to provide power to the second side using two power transceivers. A first power transceiver may include a first set of magnets positioned based on polarity to attract a second set of magnets in the second power transceiver. Each power transceiver may have a coil and a bearing on each end to enable the magnets to rotate the power transceivers, thereby causing the coils to face each other and remain within a particular distance from each other, regardless of an orientation of the computing device. In this way, power cables are not used to connect the power components to the remaining components of the computing device, thereby avoiding issues caused by repeatedly flexing the power cables.

For example, a computing device may include a first housing, a second housing, and one or more hinges that couple the first housing to the second housing. The hinge may enable the first housing to be placed at different angles (e.g., between about 0 degrees and about 360 degrees) relative to the second housing. The first housing may include (i) a computer motherboard with a graphics processing unit (GPU), (ii) a first display device to receive a first video signal from the GPU, (iii) a first power transceiver, and (iv) a power bus to distribute power received by the first power transceiver to the computer motherboard and to the first display device. The second housing may include (i) a second display device to receive a second video signal from the GPU, (ii) a battery (and a battery charger) to provide power to the second display device, and (iii) a second power transceiver to wirelessly transmit power from the battery to the first power transceiver. The first video signal may be sent from an embedded DisplayPort (eDP) output of the GPU and the second video signal may be sent from a DisplayPort (DP) output of the GPU. The computer motherboard may also include at least one central processing unit (CPU); one or more memory storage devices, and one or more input/output (I/O) ports. The first power transceiver and the second power transceiver may each include (i) a circuit board that has a coil, (ii) a first pivot, and (iii) a second pivot. The first pivot may include (i) a first slot to receive a first end of the circuit board, (ii) a first cylindrical protrusion over which a first toroidal-shaped bearing is placed, and (iii) a first cylindrical cavity into which is placed a first cylindrical-shaped magnet. The second pivot may include (i) a second slot to receive a second (e.g., other) end of the circuit board, (ii) a second cylindrical protrusion over which a second toroidal-shaped bearing is placed, and (iii) a second cylindrical cavity into which is placed a second cylindrical-shaped magnet. The first power transceiver and the second power transceiver may further include a ferrite plate located behind the circuit board, and a metal plate located behind the ferrite plate. A first set of magnets may be located in the first power transceiver and face outward with a first polarity and a second set of magnets may be located in the second power transceiver and face outward with a reverse polarity as compared to the first polarity, causing the first set of magnets to have an attraction to the second set of magnets. The first power transceiver may be enclosed in a first enclosure having a first clear window and the second power transceiver may be enclosed in a second enclosure having a second clear window to enable a first coil of the first power transceiver to be in a line of sight of a second coil of the second power transceiver, regardless of an orientation of the computing device.

As another example, a first power transceiver may receive electrical power from a power source, such as a battery, a battery charger, or an external power supply. The first power transceiver and the battery (and a battery charger) may be located behind a first display device in a first housing of a computing device. The first power transceiver may wirelessly transmit the electrical power from the first power transceiver to a second power transceiver at a frequency of either between 100 KHz-300 KHz (inductive charging) or between 4 MHz and 8 MHz. The second power transceiver may be located behind a second display device in a second housing. The second housing may be attached to the first housing by one or more hinges, thereby enabling the first display device to be placed at an angle between about 0 degrees to about 360 degrees relative to the second display device. The second power transceiver may send the electrical power to a computer motherboard located in the second housing. The computer motherboard may include (i) a graphics processing unit (GPU), (ii) at least one central processing unit (CPU), (iii) one or more memory storage devices, and (iv) one or more input/output (I/O) ports. The GPU may be integrated into the CPU or may be separate device from the CPU. The GPU may include at least (1) a DisplayPort (DP) output that is connected to the first display device and (2) an embedded DisplayPort (eDP) output connected to the second display device. The first power transceiver may include (i) a first circuit board that includes a first coil, (ii) a first set of magnets facing outward with a first polarity, and (iii) a first pair of bearings that enable the first circuit board to rotate. A first ferrite plate may be located behind the first circuit board and a first metal plate may be located behind the first ferrite plate. The second power transceiver may include a second circuit board that includes a second coil, a second set of magnets that are facing outward with a reverse polarity that has a magnetic attraction to the first set of magnets, and a second pair of bearings that enable the second circuit board to rotate. A second ferrite plate may be located behind the second circuit board and a second metal plate may be located behind the second ferrite plate. The attraction between the first set of magnets and the second set of magnets may cause the first power transceiver to rotate within the first pair of bearings and may cause the second power transceiver to rotate within the second pair of bearings, such that the first coil is facing the second coil regardless of an orientation of the computing device. In some cases, the first power transceiver may be enclosed inside a first enclosure having a first clear window (e.g., clear plastic, glass, or other transparent material) and the second power transceiver may be enclosed inside a second enclosure having a second clear window, such that the first coil of the first power transceiver is within a line of sight of the second coil of the second power transceiver, regardless of the orientation of the computing device.

As yet another example, a computing device may include a first housing coupled to a second housing by one or more hinges. The first housing may include a first power transceiver to receive wirelessly transmitted power from a second power transceiver in the second housing. The first power transceiver may include (i) a first circuit board comprising a first coil, (ii) a first set of magnets facing outward with a first polarity, and a first pair of bearings. The first power transceiver may include a first ferrite plate located behind the first circuit board and a first metal plate (e.g., copper or copper allow) located behind the first ferrite plate. Each bearing of the first pair of bearings may be located on either end of the first power transceiver. The second power transceiver may wirelessly transmit power from a power source (e.g., a battery or a power adapter) in the second housing to the first power transceiver in the first housing. A power bus may distribute power from the first power transceiver to a computer motherboard located in the first housing. The second power transceiver may include (i) a second circuit board that includes a second coil, (ii) a second set of magnets, and (iii) a second pair of bearings. The second power transceiver may include a second ferrite plate located behind the second circuit board and a second metal plate (e.g., copper or copper allow) located behind the second ferrite plate. Each bearing of the second pair of bearings may be located on either end of the first power transceiver. The second set of magnets may face outward with a reverse polarity (compared to the polarity of the first set of magnets) that results in a magnetic attraction between the second set of magnets and the first set of magnets. As a user changes an orientation of the computing device, the magnetic attraction may cause the power transceivers to rotate in their respective bearings such that the first coil in the first power transceiver faces the second coil in the second transceiver. In this way, the wireless transmission of power from the first power transceiver to the second power transceiver is uninterrupted, regardless of changes to the orientation of the computing device. The computer motherboard may include a CPU, a GPU, one or more memory storage devices, and one or more I/O ports. The GPU may be integrated into the CPU or may be a separate device from the CPU. The GPU may include a DP output connected to a first display device and an eDP output connected to a second display device. The attraction between the first set of magnets and the second set of magnets may cause the first power transceiver to rotate within the first pair of bearings and may cause the second power transceiver to rotate within the second pair of bearings such that the first coil of the first power transceiver faces the second coil of the second power transceiver, regardless of an orientation of the computing device. The second housing may include a battery charger to receive power from a source external (e.g., AC adapter) to the computing device to charge the battery. A first enclosure, in which the first power transceiver is enclosed, may include a first clear window (e.g., clear plastic, glass, or other transparent material) and a second enclosure, in which the second power transceiver is enclosed, may include a second clear window. The two clear windows may enable the first coil of the first power transceiver to remain in a line of sight of the second coil of the second power transceiver when an orientation of the computing device changes, thereby maintaining the uninterrupted wireless transmission of power between the second power transceiver and the first power transceiver.

FIG. 1 is a block diagram of an architecture of a computing device 100 that includes two wireless power transceivers according to some embodiments. The computing device 100 may include a first housing 102 coupled to a second housing 104 via one or more hinges 106. The hinges 106 may enable the two housings 102, 104 to be positioned at different angles relative to each other and in different orientations, as described herein.

The first housing 102 may include a first housing that houses a first display device 108. Components of the computing device 100, e.g., a computer motherboard, may be located behind the first display device 108. For example, the first housing 102 may include at least one central processing unit (CPU) 112, a graphics process unit (GPU) 114, and a memory (e.g., computer-readable media) 114. The GPU 114 may be integrated into the CPU 112 or may be a separate device from the GPU 114. The CPU 112 and GPU 114 may be connected to an input/output (I/O) bus 118 that provides one or more I/O ports 120. For example, the ports 120 may include video ports, such as a video graphics adapter (VGA) port, a digital video interface (DVI) port, a high definition media interface (HDMI) port, a ThunderBolt® port, another type of video port, or any combination thereof. The ports 120 may include one or more universal serial bus (USB) ports compliant with USB 2.0, USB 3.0, and the like. The ports 120 may include an Ethernet port, audio I/O ports, and the like. The GPU 114 may include an embedded DisplayPort (eDP) output 122 to drive the first display device 108 and a DisplayPort (DP) output 124 to drive a second display device 110. For example, a cable may be threaded from the GPU 114, through one or more of the hinges 106, to connect the GPU 114 to the second display device 110. A power bus 126 may provide power to the various components (e.g., the first display device 108, the CPU 112, the GPU 114, the memory 116, the I/O ports 120, and the like) that are located in the first housing 102 of the computing device 100. While connections from the power bus 126 to the various components located in the first housing 102 are not illustrated in FIG. 1, it should be understood that the power bus 126 provides power to all the components located in the first housing 102 that use power. The power bus 126 is connected to a first power transceiver 128 that is associated with the first housing 102. The first power transceiver 128 is positioned to receive power from (or send power to) a second power transceiver 130 that is associated with the second housing 104.

The second housing 104 may include a second housing that houses the second display device 110. The second display device 110 may be driven by the DP output 124 of the GPU 114. Power-related components of the computing device 100 may be located behind the second display device 110. For example, a battery 132 may be connected to the second power transceiver 130 to enable the second power transceiver 130 to provide power to the second display device 110, to additional components located in the second housing 104 and to wirelessly transmit power to the first power transceiver 128 associated with the first housing 102.

For example, the second housing 104 may include additional components of the computing device 100, such as one or more input devices 138 (e.g., keyboard, touchpad, trackball, and the like). The second housing 104 may include at least one of the second display 110 or the input devices 138. A battery charger 136 may be connected to the battery 132 to charge the battery 132 when direct current (DC) power (or alternating current (AC) power) is provided via the power input 134. The battery charger 136 may also be used as a power source to provide power instead of the battery 132 when the battery 132 is depleted or inoperable. The power transceivers 128, 130 may operate at between approximately 100 KHz to 300 KHz (for inductive charging) or between approximately 4 MHz to 8 MHz (for resonant charging). For example, in some cases, the resonant charging may use a frequency of approximately 6.78 MHz.

In some cases, a second, smaller (e.g., smaller than the battery 132) may be included in the power bus 126 and may provide power to the components of the first housing 102 if power transmission between the power transceivers 128, 130 is interrupted. The smaller battery may enable the user sufficient time to complete tasks, such as saving unsaved work (e.g., unsaved modifications to documents, spreadsheets, presentations, or the like).

While the computing device 100 is illustrated as having two display devices, the second housing may not include a display device. For example, the computing device 100 may include the first display device 108 in the first housing 102 and a keyboard (and other input devices such as a touchpad) may be included in the second housing 104, similar to a laptop computing device.

Thus, the various computing components (e.g., 112, 114, 116, and 120) may be located behind the first display device 108 on the first housing 102 of the dual-display computing device 100. The power components (e.g., battery 132, battery charger 136, and the power input 134) may be located behind the second display device 110 on the second housing 104 of the dual-display computing device 100. Power from the charger 136 or the battery 132 may be transmitted from the second power transceiver 130 associated with the second housing 104 to provide power to the first power transceiver 128 associated with the first housing 102. The first power transceiver 128 may include a first set of magnets positioned based on polarity to attract a second set of magnets in the second power transceiver 130. Each power transceiver 128, 130 may have a coil and a bearing on each end to enable the magnets to rotate the power transceivers 128, 130, thereby causing the coils to face each other and remain within a particular distance from each other, regardless of an orientation of the computing device 100. In this way, power cables may not be used to connect the power components 132, 134, 136 of the second housing 104 to the computing components 108, 112, 114, 116, and 120 of the computing device, thereby avoiding issues caused by repeatedly flexing power cables running between the first housing 102 and the second housing 104. In addition, by separating the computing components (112, 114, 116) from the power components (e.g., 132, 134, 136) by placing them in different housings, crosstalk may be reduced and noise isolation increased.

Figure 2:
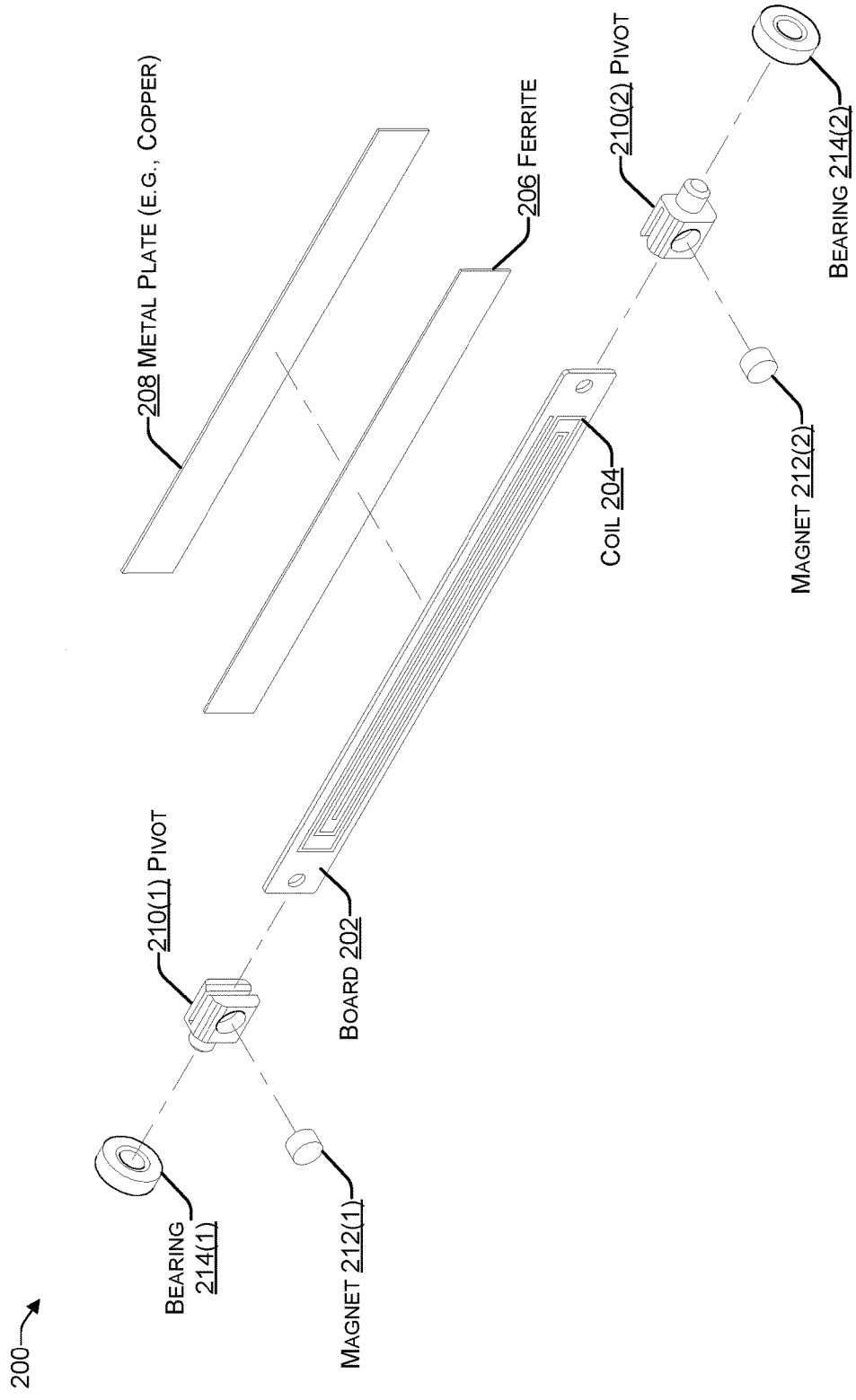
FIG. 2 is a block diagram of an architecture that includes components of a wireless power transceiver according to some embodiments.

FIG. 2 is a block diagram of an architecture that includes components of a wireless power transceiver 200 (e.g., one of the power transceivers 128, 130 of FIG. 1) according to some embodiments. For example, the wireless power transceiver 200 may include a circuit board 202 that includes a coil 204. The coil 204 may be capable of transmitting and receiving power from another coil of another power transceiver. The shape and direction of the coil 204 show in FIG.

2 is purely for illustration and it should be understood that the coil 204 may be a different shape (e.g., circular, elliptical, or the like) and may have a different direction (e.g., the base of the coil may be on the board 202 and the top of the coil 204 may protrude out from the board 202).

A ferrite plate 206 and a metal plate 208 may be placed behind the board 202. The ferrite plate 206 may be composed of a type of ceramic compound that includes iron oxide combined chemically with one or more additional metallic elements. The ferrite plate 206 may be both electrically non-conductive and ferro-magnetic (e.g., capable of being magnetized or attracted to a magnet). The metal plate 208 may be made from metal (e.g., copper, iron, nickel, or the like) or a metal alloy (e.g., copper alloy, iron allow, nickel alloy, or the like).

A pivot 210(1) and 210(2) may be attached to each end of the board 202. For example, as illustrated in FIG. 2, each pivot 210(1), 210(2) may include a slot into which the board 202, the ferrite plate 206, and the metal plate 208 may be inserted and held in place. Each of the pivots 210(1), 210(2) may include a cylindrical cavity into which is placed a magnet 212(1), 212(2), respectively. The magnets 212 may be permanent magnets or electromagnets. Each of the pivots 210(1), 210(2) may include a cylindrical protrusion to which is attached a bearing 214(1), 214(2), respectively. The bearings 214 may include ball bearings that enable the assembly that includes the board 202, the ferrite plate 206, and the metal plate 208 to rotate with very little friction. The bearings 214 may be toroidal-shaped, e.g., with a hole in the middle, that enables the bearings 214 to placed on to the cylindrical protrusions of the pivots 210.

In some cases, the power transceiver 200 may be sealed inside an enclosure (e.g., plastic. metal, or other type of enclosure) to protect the components of the power transceiver 200. At least a portion of the enclosure may be clear (e.g., clear plastic or glass) to enable the coil 204 to have a line of sight to the other coil.

The board 202 may be approximately between approximately 0.2 millimeters (mm) and approximately 0.6 mm thick, the ferrite plate may be between approximately 0.3 millimeters (mm) and approximately 0.7 mm thick, and the metal plate 208 may be between approximately 0.05 millimeters (mm) and approximately 0.15 mm thick. For example, in some cases the board 202 may have a thickness of about 0.4 mm, the ferrite plate 206 may have a thickness of about 0.5 mm, and the metal plate (e.g., copper or copper alloy plate) 208 may have a thickness of about 0.1 mm.

Figure 3:
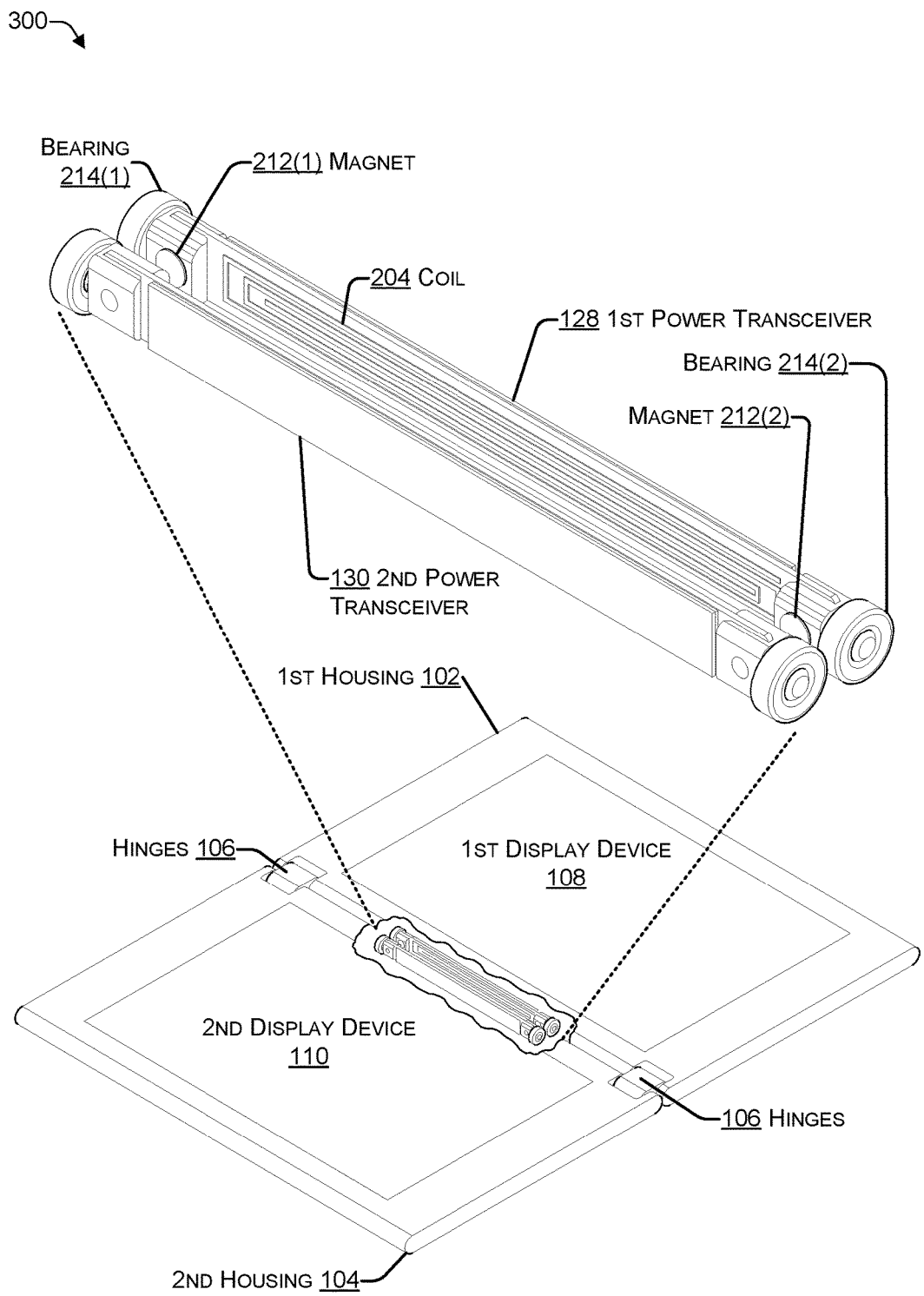
FIG. 3 is a block diagram of an architecture of a computing device in which two wireless power transceivers maintain a particular orientation with reference to each other according to some embodiments.

FIG. 3 is a block diagram of an architecture 300 of a computing device in which two wireless power transceivers approximately maintain a particular orientation with reference to each other according to some embodiments. The magnets 212 of the first power transceiver 128 associated with the first housing 102 may interact with magnets on the second power transceiver 130 associated with the second housing 104. For example, the magnets 212 may be placed in the pivots with a particular polarity facing away from the board 202. Additional magnets placed in the pivots of the second power transceiver 130 may face the magnets 212 with an opposite polarity. In this way, the magnets 212 may be attracted to the additional magnets of the second power transceiver 130. The attraction of the magnets in the first power transceiver 128 to the magnets in the second power transceiver 130 may cause the bearings of the power transceivers 128, 130 to rotate the power transceivers 128, 130 when an orientation of the computing device 100 changes in such a way as to keep the coil 204 facing the coil in the second power transceiver 130. In this way, power can be wireless transmitted without interruption from one side of the computing device 100 to the other side regardless of the orientation of the computing device 100.

The magnets 212 and the bearings 214 may orient the first power transceiver 128 such that the coil 204 is approximately parallel to a coil of the second power transceiver 130. For example, the coil 204 may not be exactly parallel, with slight deviations in angle causing a loss in efficiency that is within a threshold range (e.g., no more than 5% loss of efficiency). The distance between the coil 204 and the coil of the second power transceiver 130 may be between 5 millimeters (mm) and 15 mm. For example, in some cases, the distance between the coil 204 and the coil of the second power transceiver 130 may be approximately 10 mm. The power transceivers 128, 130 may transmit power at between approximately 100 KHz to 300 KHz (for inductive charging) or between approximately 4 MHz to 8 MHz (for resonant charging). For example, in some cases, the resonant charging may use a frequency of approximately 6.78 MHz.

In some cases, the power transceivers 128, 130 may be sealed inside an enclosure (e.g., plastic. metal, or other type of enclosure) to protect the components of the power transceivers 128, 130. In some cases, at least a portion (e.g., a window) of the enclosure may be clear (e.g., clear plastic, glass, or another transparent material) to enable a first coil of the first power transceiver 128 to remain in a line of sight to the second coil of the second power transceiver 130 as the orientation of the computing device 100 changes.

Figure 4:
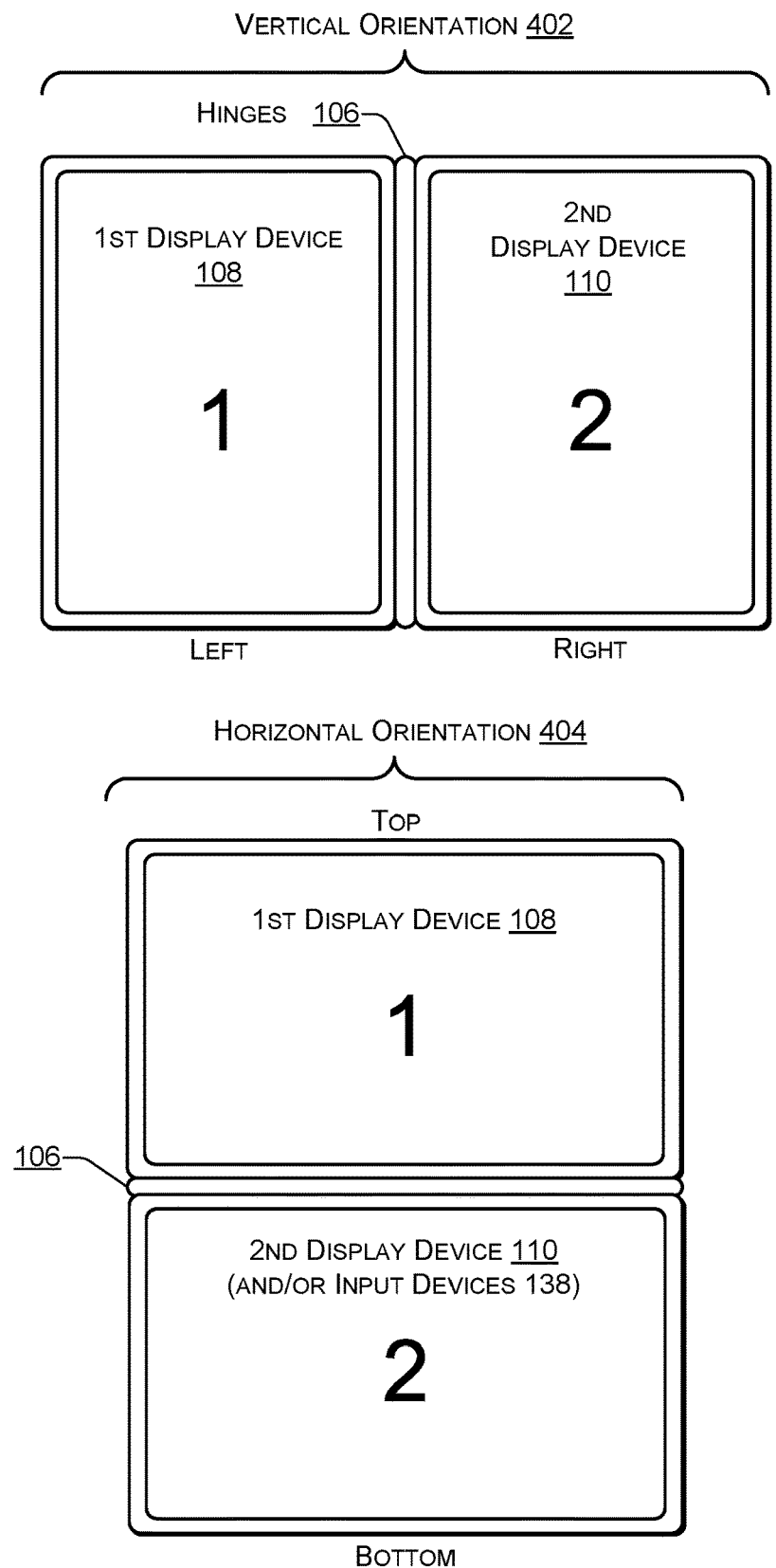
FIG. 4 is a block diagram illustrating different orientations of a dual-display device according to some embodiments.

FIG. 4 is a block diagram 400 illustrating different orientations of a dual-display device (e.g., the computing device 100 of FIG. 1) according to some embodiments. The computing device 100 may include the first display device 108 and at least one of the second display device 110 or the input devices 138 (e.g., keyboard, trackpad, trackball, and the like).

The computing device 100 may be placed in a vertical (e.g., portrait) orientation 202 or a horizontal (e.g., landscape) orientation 204. For example, in the vertical orientation 402, the first display device 108 may be on one side (e.g., the left side or the right side), the second display device 110 may be on another side (e.g., the right side or the left side), and the hinges 106 may join the first display device 108 to the second display device 110. In the vertical orientation 404, the first display device 108 may be located at the top (or the bottom) of the computing device 100, with the hinges 106 in the middle, and the second display device 110 at the bottom (or the top) of the computing device.

Figure 5:
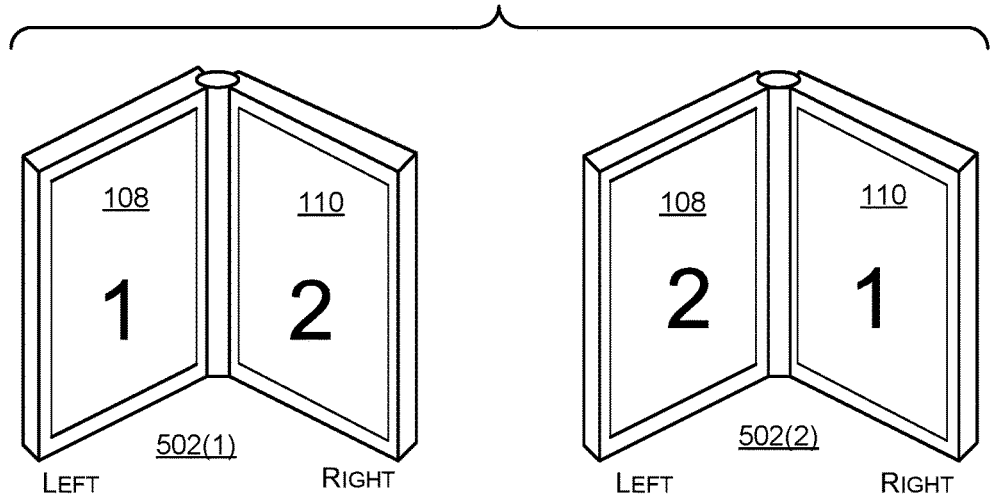
FIG. 5 is a block diagram illustrating vertical orientations of a dual-display device according to some embodiments.
Figure 5:
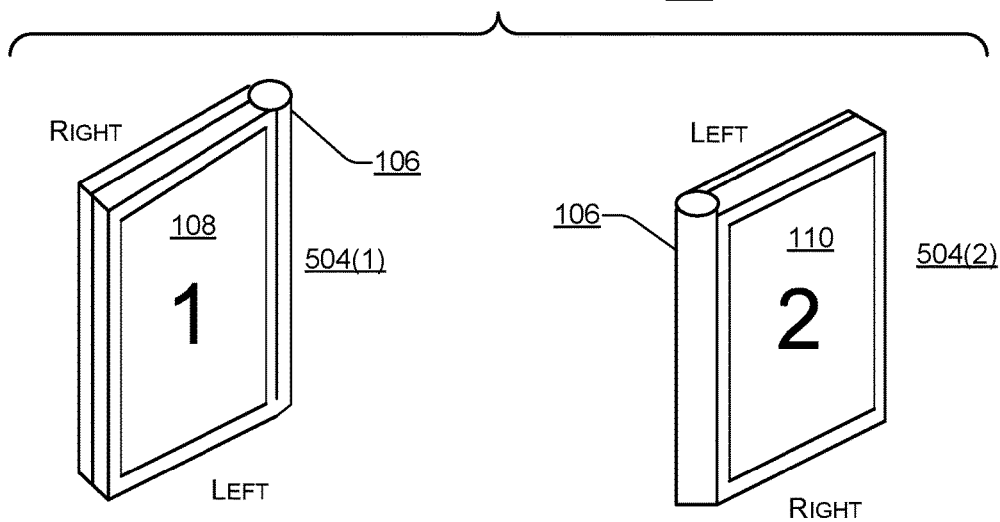

FIG. 5 is a block diagram 500 illustrating vertical orientations of a dual-screen device (e.g., the computing device 100 of FIG. 1) according to some embodiments. Examples of the vertical orientation 402 may include a book orientation 502 or a vertical tablet orientation 504. For example, in a first book orientation 502(1), the first display device 108 may be on the left and the second display device 110 may be on the right. Alternately, in a second book orientation 502(2), the second display device 110 may be on the left and the first display device 108 may be on the right.

In the vertical tablet orientation 504, the first display device 108 may be on the left and the second display device 110 may be on the right. In a first vertical tablet orientation 504(1), the first display device 108 may be facing a user and the second display device 110 may be rotated approximately 360 degrees to face away from the user. In a second vertical tablet orientation 504(2), the second display device 110 may be facing the user while the first display device 108 may rotated approximately 360 degrees to face away from the user.

Figure 6:
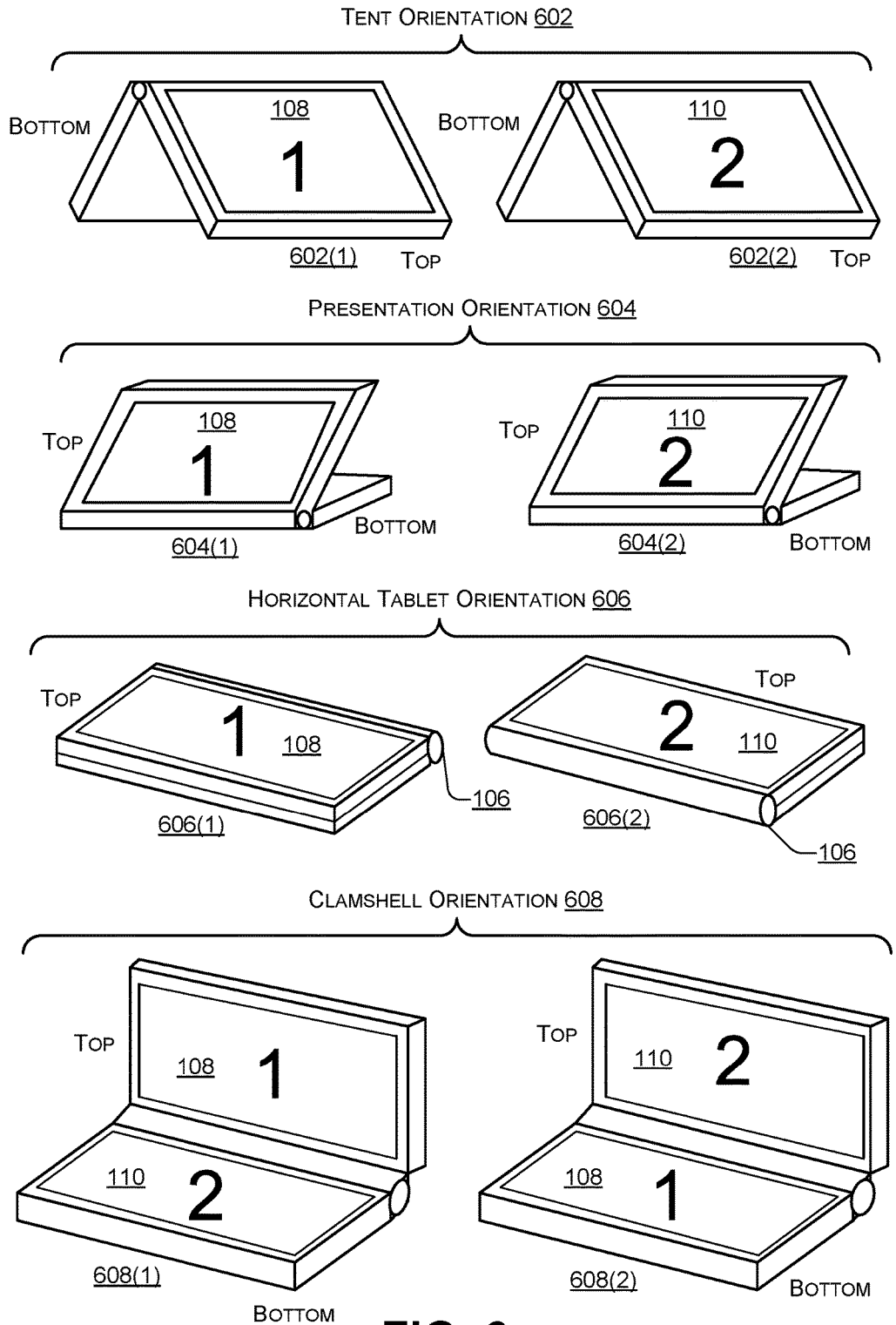
FIG. 6 is a block diagram illustrating horizontal orientations of a dual-display device according to some embodiments.

FIG. 6 illustrates horizontal orientations of a dual-screen device (e.g., the computing device 100 of FIG. 1) according to some embodiments. Examples of the horizontal orientation 404 may include a tent orientation 602, a presentation orientation 604, a horizontal tablet orientation 606, and a clamshell orientation 608.

In 602(1), the first display device 108 may be at the top facing the user while the second display device 110 may be at the bottom facing away from the user. In 602(2), the second display device 110 may be at the top facing the user and the first display device 108 may be at the bottom facing away from the user.

In 604(1), the first display device 108 may be at the top facing the user and the second display device 110 may be at the bottom facing down. In 604(2) the second display device 110 may be at the top facing the user and the first display device 108 may be at the bottom facing down.

In 606(1), the first display device 108 may be at the top facing the user and the second display device 110 may be at the bottom facing down (e.g., away from the user). In 606(2), the second display device 110 may be at the top facing the user and the first display device 108 may be at the bottom facing down (e.g., away from the user).

In 608(1), the first display device 108 may be at the top facing the user and the second display device 110 may be at the bottom facing the user (e.g., in a position where traditionally, a keyboard is located in a laptop). In 608(1), in some cases, a QWERTY-based keyboard may be displayed on the second display device 110 and used to receive keyboard input. In 608(2), the second display device 110 may be at the top facing the user and the first display device 108 may be at the bottom facing the user (e.g., in a position where traditionally, a keyboard is located in a laptop). In 608(2), in some cases, a QWERTY-based keyboard may be displayed on the first display device 108 and used to receive keyboard input.

Figure 7:
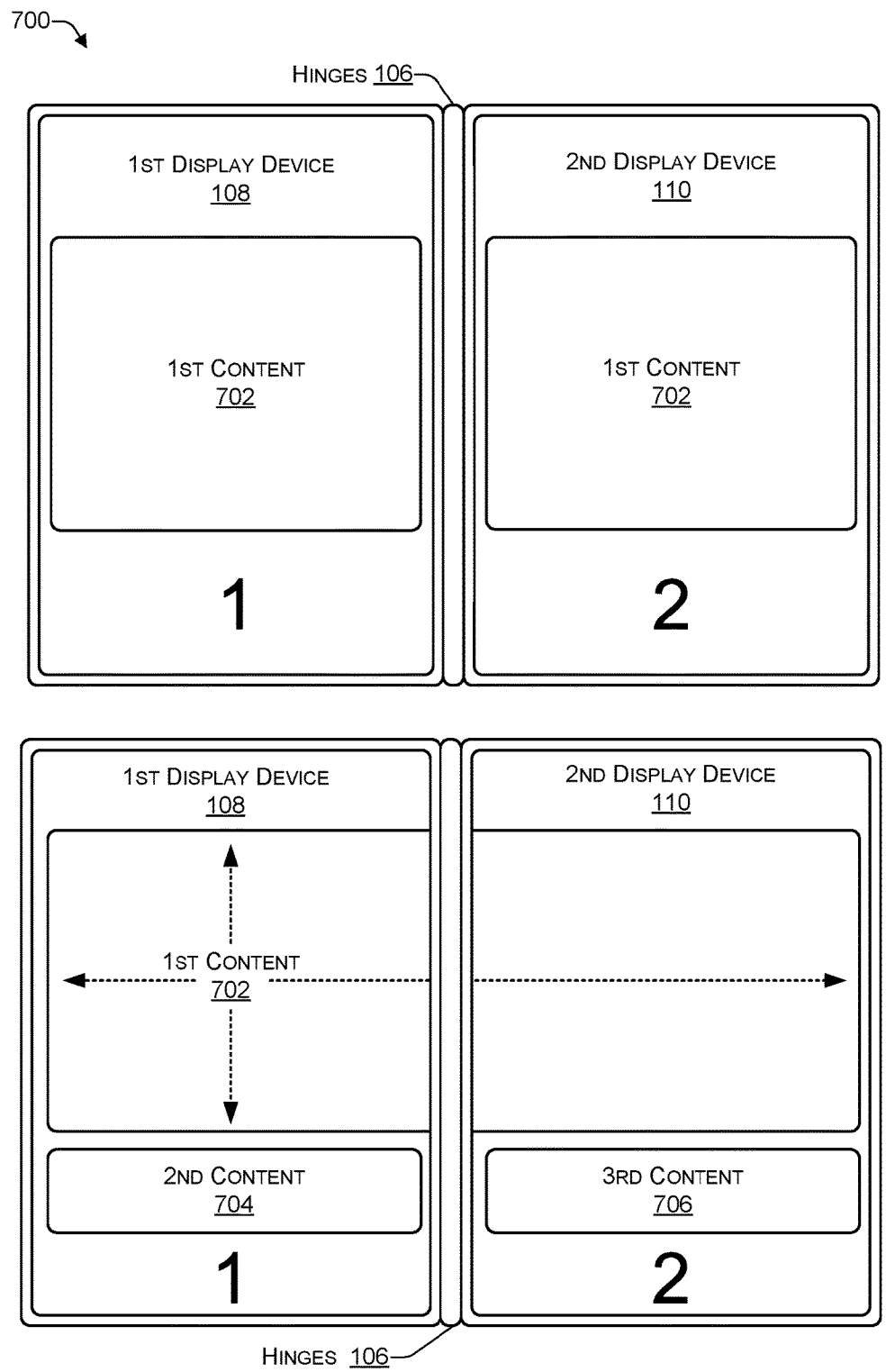
FIG. 7 is a block diagram illustrating different display modes of a dual-display device according to some embodiments.

FIG. 7 is a block diagram illustrating different display modes of a dual-display device (e.g., the computing device 100 of FIG. 1) according to some embodiments. The top half of FIG. 7 illustrates when an operating system of the dual-display device is set to display content in a clone mode or in a single display mode. In the clone mode, first content 702 may be displayed both on the first display device 108 and on the second display device 110. In the single display mode, the first content 702 may be displayed on either (but not both) of the first display device 108 or the second display device 110.

The bottom half of FIG. 7 illustrates when an operating system of the dual-display device is set to display content in an extended display mode, in which the second display device 110 is setup as an extension of the first display device 108. In the extended display mode, some content, such as the first content 702, may be displayed across both the first display device 108 and the second display device 110. In some cases, additional content may be displayed on either the first display device 108 or the second display device 110. For example, second content 704 may be displayed on the first display device 108 and third content 706 may be displayed on the second display device 110.

Figure 8:
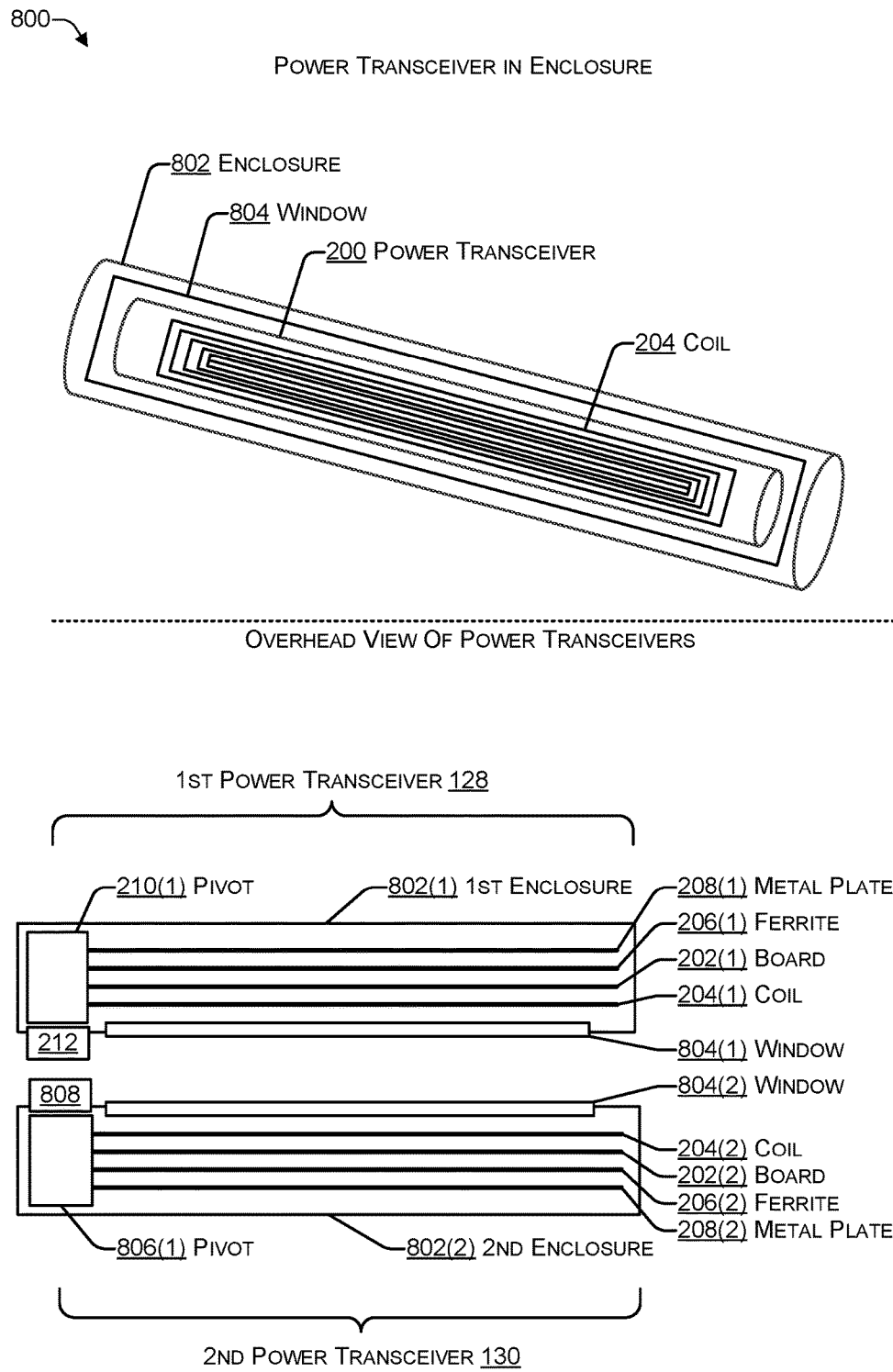
FIG. 8 is a block diagram of an architecture 800 of a wireless power transceiver in an enclosure according to some embodiments.

FIG. 8 is a block diagram of an architecture 800 of a wireless power transceiver in an enclosure according to some embodiments. The top illustration in FIG. 8 illustrates how the wireless power transceiver 200 of FIG. 2 (or one of the power transceivers 128, 130 of FIG. 1) may be enclosed inside an enclosure 802. The enclosure 802 may be made out a material (e.g., plastic) through which the EHF wireless frequency (e.g., between 50 GHz and 70 GHz) may be transmitted. In some cases, the enclosure 802 may include a window 804 to enable the coil 204 to remain in a line of sight of the other coil of the other power transceiver, thereby providing an uninterrupted wireless transmission of power.

The bottom illustration in FIG. 8 illustrates an overhead view of the power transceivers 128, 130 and provides an example of how the coils of each of the power transceivers 128, 130 may remain facing each other after an orientation of the computing device 100 has changed.

The first power transceiver 128 may include a pivot 210(1), 210(2) on either end (for ease of understanding, the pivot on the right end, 210(2), is not shown but should be understood to be present). The first power transceiver 128 may include the coil 204(1) attached to the board 202(1). The ferrite plate 206(1) may be located behind the board 202(1). The metal plate 208(1) (e.g., copper or copper alloy) may be located behind the ferrite plate 206(1). The first power transceiver 128 may be enclosed by the first enclosure 802(1). The first enclosure 802(1) may include the window 804(1) to enable the coil 204(1) to remain in a line of sight of the coil 204(2). One or magnets 212 may be located on the pivots 210 of the first power transceiver 128.

The second power transceiver 130 may include a pivot 806(1), 806(2) on either end (for ease of understanding, the pivot on the right end, 806(2), is not shown but should be understood to be present). The second power transceiver 130 may include the coil 204(2) attached to the board 202(2). The ferrite plate 206(2) may be located behind the board 202(2). The metal plate 208(2) (e.g., copper or copper alloy) may be located behind the ferrite plate 206(2). The second power transceiver 130 may be enclosed by the second enclosure 802(2). The second enclosure 802(2) may include the window 804(2) to enable the coil 204(2) to remain in a line of sight of the coil 204(1). One or magnets 808 may be located on the pivots 806 of the second power transceiver 130.

The interaction (e.g., attraction) of the magnets 212 to the magnets 808 may cause at least one of the power transceivers 128, 130 to rotate within their respective pivots, thereby keeping the coils 204(1), 204(2) facing each other, regardless of the orientation of the computing device 100. In this way, the wireless transmission of power from the second power transceiver 130 to the first power transceiver 128 (or from the first power transceiver 128 to the second power transceiver 130) may remain uninterrupted when the orientation of the computing device 100 is changed from a first orientation to a second orientation.

The magnets 212, 808 and the pivots 210, 806 may orient the first power transceiver 128 such that the coil 204(1) is approximately parallel to the coil 204(2) of the second power transceiver 130. For example, the coil 204(1) may not be exactly parallel to the coil 204(2), with slight deviations in angle causing a loss in efficiency that is within a threshold range (e.g., no more than 5% loss of efficiency). The distance between the coil 204(1) and the coil 204(2) may be between approximately 5 millimeters (mm) and approximately 15 mm. For example, in some cases, the distance between the coil 204 and the coil of the second power transceiver 130 may be approximately 10 mm.

The power transceivers 128, 130 may transmit power at between approximately 100 KHz to 300 KHz (for inductive charging) or between approximately 4 MHz to 8 MHz (for resonant charging). In some cases, the resonant charging may use a frequency of approximately 6.78 MHz. The enclosures 802(1), 802(2) may use materials that are capable of transmitting power at frequencies with less than a threshold (e.g., 5%) signal loss. By using frequencies EHF, radio frequency interference (RFI) and electromagnetic interference (EMI) may be reduced or eliminated. The windows 804(1), 804(2) may be composed of a same or of a different material as compared to the enclosure 802. For example, in some cases, the windows 804(1), 804(2) may use materials that are capable of transmitting frequencies between about 100-300 KHz or between about 4-8 MHz while the enclosures 802(1), 802(2) may use materials that are incapable of transmitting (e.g., damping) such frequencies.

Figure 9:
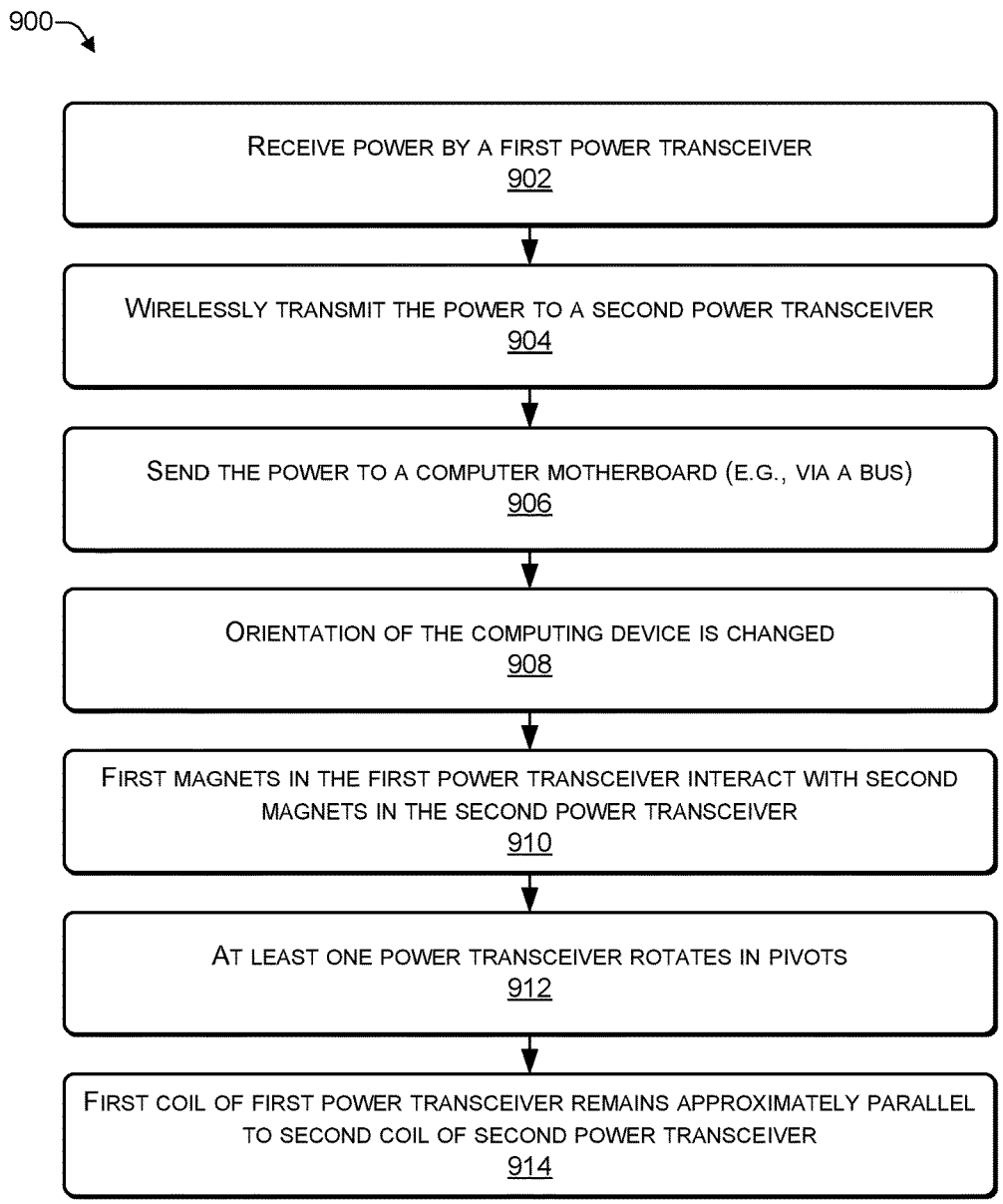
FIG. 9 is a flowchart of a process that includes positioning a first coil of a first power transceiver in a line of sight of a second coil of a second power transceiver according to some embodiments.

In the flow diagram of FIG. 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 900 is described with reference to FIGS. 1, 2, 3, 4, 5, 6, 7, 8 as described above, although other models, frameworks, systems and environments may be used to implement these processes.

FIG. 9 is a flowchart of a process 900 that includes positioning a first coil of a first power transceiver in a line of sight of a second coil of a second power transceiver according to some embodiments. The process 900 may be performed by one or more components of the computing device 100 of FIG. 1.

At 902, power may be received by a first power transceiver. At 904, the first power transceiver may wireless transmit the power from the first power transceiver to a second power transceiver. At 906, the second power transceiver may send the power to a computer motherboard (e.g., a CPU, a GPU, a memory, and one or more I/O ports). In FIG. 1, the roles of the first transceiver and the second transceiver are reversed. Thus, for example, in FIG. 1, the second power transceiver 130 may receive power from a power source, such as the battery 132 or the charger 136. The second power transceiver 130 may transmit the power to the first power transceiver 128. The first power transceiver 128 may send the power to the power bus 126 for distribution to a motherboard (e.g., to the components 112, 114, 116, 120).

At 908, a change in an orientation of the computing device may occur. At 910, a first set of magnets in the first power transceiver may interact with a second set of magnets in the second power transceiver. At 912, at least one of the first power transceiver or the second power transceiver may rotate in pivots on either end of each power transceiver. At 914. a first coil of the first power transceiver may remain approximately parallel to a second coil of the second power transceiver. For example, a user may change an orientation of the computing device 100. To illustrate, in FIG. 4, the user may change the computing device 100 from one of the vertical orientations 402, 502, 504 to one of the horizontal orientations 404, 602, 604, 606, 608 or from one of the horizontal orientations 404, 602, 604, 606, 608 to one of the vertical orientations 402, 502, 504. In FIG. 3, the magnets 212 of the first power transceiver may interact with magnets of the second power transceiver 130. For example, the magnets 212 of the first power transceiver may face the second power transceiver 130 with a first polarity and the magnets of the second power transceiver 130 may face the magnets 212 with an opposite polarity, thereby resulting in an attraction between the magnets 212 of the first power transceiver 128 and the magnets of the second power transceiver 130. This magnetic attraction may cause at least one of the power transceivers 128, 130 to rotate within the bearings 214, resulting in the coil 204 of the first power transceiver 128 being (e.g., continuing to be) approximately parallel (e.g., in the line of sight) of a coil of the second power transceiver 130.

Thus, a computing device may include a first power transceiver and a second power transceiver. The first power transceiver may receive power from a power source (e.g., a battery, a battery charger, or an external power source) and wirelessly transmit the power to a second power transceiver at a particular frequency. The first power transceiver may transmit power at between approximately 100 KHz to 300 KHz (for inductive charging) or between approximately 4 MHz to 8 MHz (for resonant charging). For example, in some cases, the resonant charging may use a frequency of approximately 6.78 MHz. The second power transceiver may distribute the power to a first display device and to a computer motherboard located, e.g., via a power bus. The first power transceiver may include a first set of magnets positioned to attract a second set of magnets in the second power transceiver. Each power transceiver may include a bearing on either end that enables each power transceiver to rotate, such that a first coil of the first power transceiver is in a line of sight of a second coil of the second power transceiver, regardless of changes to an orientation of the computing device.

Figure 10:
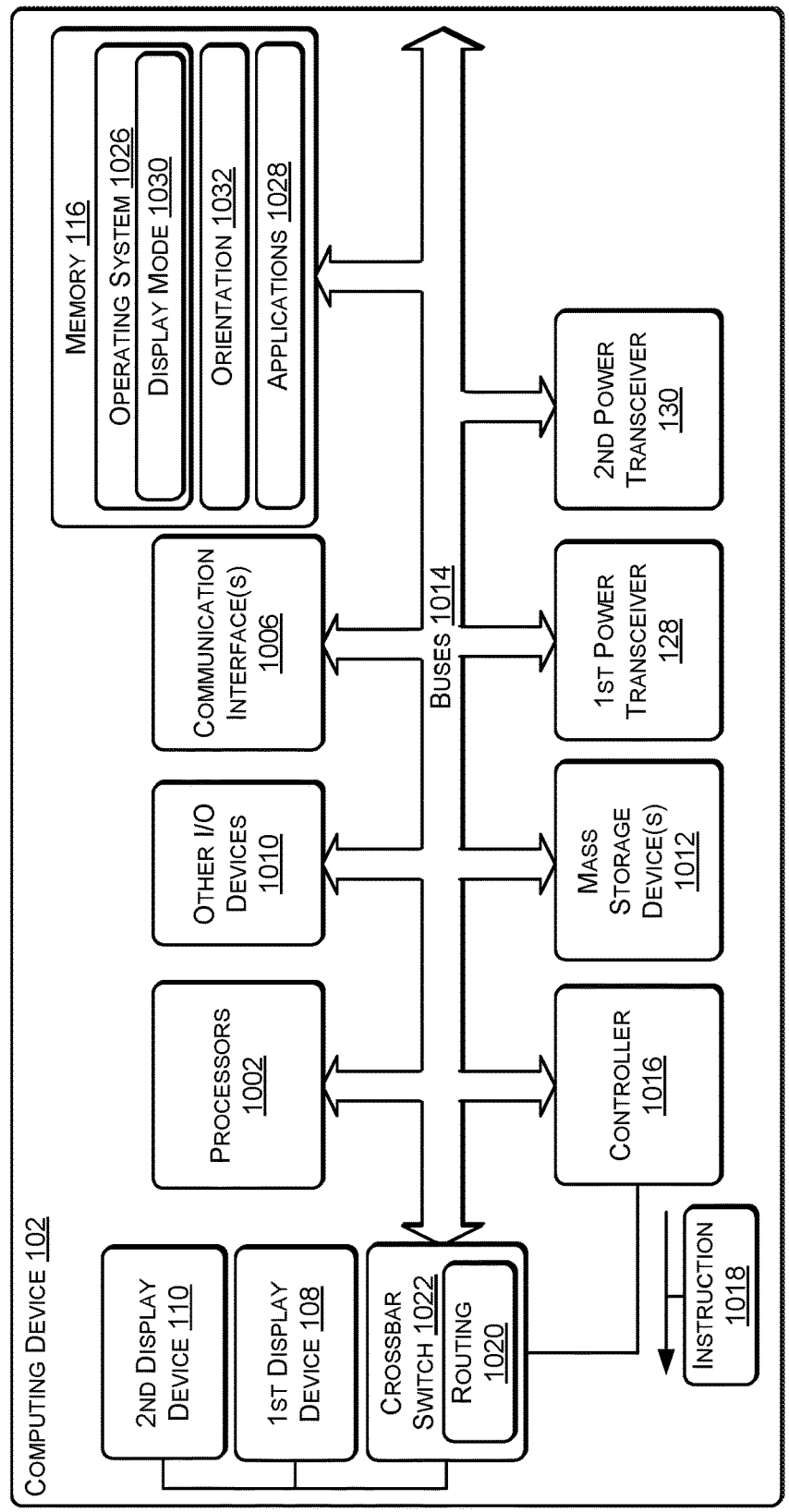
FIG. 10 illustrates an example configuration of a computing device that can be used to implement the systems and techniques described herein.

FIG. 10 illustrates an example configuration of the computing device 100 of FIG. 1 that can be used to implement the systems and techniques described herein. The computing device 100 may include one or more processors 1002 (e.g., the CPU 112 and the GPU 114 of FIG. 1), the memory 116, communication interfaces 1006 (e.g., the I/O ports 120), the display devices 108, 110, other input/output (I/O) devices 1010, and one or more mass storage devices 1012, configured to communicate with each other, such as via one or more system buses 1014 or other suitable connection. While a single bus is illustrated for ease of understanding, it should be understood that the system buses 1014 may include multiple buses, such as memory device buses, storage device buses, the power bus 126, video signal buses, and the like.

The processors 1002 are one or more hardware devices that may include a single processing unit or a number of processing units, all of which may include single or multiple computing units or multiple cores. The processors 1002 may include an integrated GPU or the GPU a separate processor device. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 116, mass storage devices 1012, or other computer-readable media.

Memory 116 and mass storage devices 1012 are examples of non-transitory computer media (e.g., memory storage devices) for storing instructions that can be executed by the processors 1002 to perform the various functions described herein. For example, memory 116 may include both volatile memory and non-volatile memory (e.g., RAM, ROM, or the like) devices. Further, mass storage devices 1012 may include hard disk drives, solid-state drives, removable media, including external and removable drives, memory cards, flash memory, floppy disks, optical disks (e.g., CD, DVD), a storage array, a network attached storage, a storage area network, or the like. Both memory 116 and mass storage devices 1012 may be collectively referred to as memory or computer storage media herein, and may be a non-transitory media capable of storing computer-readable, processor-executable program instructions as computer program code that can be executed by the processor 1002 as a particular machine configured for carrying out the operations and functions described in the implementations herein.

The computing device 100 may also include one or more communication interfaces 1006 for exchanging data via a network. The communication interfaces 1006 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1006 can also provide communication with external storage (not shown), such as in a storage array, network attached storage, storage area network, or the like. The display devices 108, 110 may be connected to each other using one or more hinges (e.g., the hinges 106 of FIG. 1) that enable each display device to rotate relative to the other display device. The display devices 108, 110 may be used for displaying information and images to users. Other I/O devices 1010 may be devices that receive various inputs from a user and provide various outputs to the user, and may include a keyboard, a remote controller, a mouse, a printer, audio input/output devices, and so forth.

The computer storage media, such as memory 116 and mass storage devices 1012, may be used to store software and data. For example, the computer storage media may be used to store an operating system 1026 and software applications 1028. The operating system 1026 may be set to a particular display mode 1030. For example, the operating system 1026 may have a default display mode and a user may set the display mode 1030 to something different than the default display mode. The display mode 1030 may be one of (1) an extended display mode (e.g., see bottom of FIG. 7), (2) a single display mode (e.g., see top of FIG. 7), or (3) a clone mode (e.g., see top of FIG. 7). The computer storage media may store an orientation 1032, and one or more software applications 1028. The software applications 1028 (e.g., the content 702, 704, 706 of FIG. 7) may include a word processing application, a spreadsheet application, and the like.

The controller 1016 may determine the display mode 1030 of the operating system, may determine if the content 1022 to be displayed includes DRM 1024, and may determine the orientation 1032 of the computing device 100 having the two display devices 108, 110. Based on the display mode 1030, the orientation 1032, and whether content being displayed includes digital rights management (DRM), the controller 1016 may select a routing 1020 from one of the multiple routings (e.g., normal, swap, eDP only, or DP only) associated with a crossbar switch 1022. The controller 1016 may modify the content 1022 to create modified content. The modified content may be routed by the crossbar switch 1022 to one or both of the display devices 108, 110 according to the selected routing 1020.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computing device comprising:
 a first housing comprising:
  a computer motherboard; and
  a first power transceiver to receive wirelessly transmitted power;
  a power bus to distribute power from the first power transceiver to the computer motherboard;
 a second housing comprising:
  a power source; and
  a second power transceiver to wirelessly transmit power from the power source to the first power transceiver; and
 one or more hinges to rotatably couple the first housing to the second housing;
 wherein the first power transceiver and the second power transceiver each comprise:
  a circuit board comprising a coil;
  a first pivot comprising:
   a first slot to receive a first end of the circuit board;
   a first cylindrical protrusion over which a first toroidal-shaped bearing is placed; and
   a first cylindrical cavity into which is placed a first cylindrical-shaped magnet;
  a second pivot comprising:

a second slot to receive a second end of the circuit board;
a second cylindrical protrusion over which a second toroidal-shaped bearing is placed; and
a second cylindrical cavity into which is placed a second cylindrical-shaped magnet.

2. The computing device of claim 1, wherein electrical power is wirelessly transmitted the from the first power transceiver to the second power transceiver at a frequency of between:
about 100 Kilohertz (KHz) to about 300 KHz; or
about 4 Megahertz (MHz) to about 8 MHz.

3. The computing device of claim 1, wherein the first power transceiver and the second power transceiver each further comprise:
a ferrite plate located behind the circuit board; and
a metal plate located behind the ferrite plate.

4. The computing device of claim 1, wherein:
a first set of magnets is located in the first power transceiver and face outward with a first polarity; and
a second set of magnets is located in the second power transceiver and face outward with a reverse polarity as compared to the first polarity, causing the first set of magnets to have an attraction to the second set of magnets.

5. The computing device of claim 1, wherein the computer motherboard further comprises:
at least one central processing unit (CPU);
a graphics processing unit (GPU); and
one or more memory storage devices; and
one or more input/output (I/O) ports.

6. The computing device of claim 5, further comprising:
a first display device in the first housing connected to a first video signal from an embedded DisplayPort (eDP) output of the GPU to; and
to a second display device in the second housing connected to a second video signal from a DisplayPort (DP) output of the GPU.

7. The computing device of claim 1, wherein:
the first power transceiver is enclosed in a first enclosure having a first clear window; and
the second power transceiver is enclosed in a second enclosure having a second clear window to enable a first coil of the first power transceiver to be approximately parallel to a second coil of the second power transceiver.

8. A method comprising:
receiving, by a first power transceiver, electrical power from a power source, the first power transceiver located behind a first display device in a first housing of a computing device;
wirelessly transmitting the electrical power from the first power transceiver to a second power transceiver, the second power transceiver located behind a second display device in a second housing that is rotatably attached to the first housing by one or more hinges; and
sending the electrical power from the second power transceiver to a computer motherboard located in the second housing.

9. The method of claim 8, wherein wirelessly transmitting the electrical power from the first power transceiver to the second power transceiver comprises one of:
wirelessly transmitting the electrical power from the first power transceiver to the second power transceiver at a frequency of between about 100 Kilohertz (KHz) and about 300 KHz; or
wirelessly transmitting the electrical power from the first power transceiver to the second power transceiver at a frequency of between about 4 Megahertz (MHz) to 8 MHz.

10. The method of claim 8, wherein the computer motherboard comprises:
a graphics processing unit (GPU) comprising a DisplayPort (DP) output connected to the first display device and an embedded DisplayPort (eDP) output connected to the second display device;
at least one central processing unit (CPU);
one or more memory storage devices; and
one or more input/output (I/O) ports.

11. The method of claim 8, wherein:
the first power transceiver comprises:
a first circuit board comprising a first coil;
a first set of magnets facing outward with a first polarity; and
a first pair of bearings that enable the first circuit board to rotate; and
the second power transceiver comprises:
a second circuit board comprising a second coil;
a second set of magnets facing outward with a reverse polarity that has a magnetic attraction to the first set of magnets; and
a second pair of bearings that enable the second circuit board to rotate.

12. The method of claim 11, wherein the magnetic attraction between the first set of magnets and the second set of magnets causes:
the first power transceiver to rotate within the first pair of bearings;
the second power transceiver to rotate within the second pair of bearings; and
the first coil to remain facing the second coil regardless of an orientation of the computing device.

13. The method of claim 11, wherein:
the first power transceiver further comprises:
a first ferrite plate located behind the first circuit board;
a first metal plate located behind the first ferrite plate;
a first enclosure having a first clear window; and
the second power transceiver comprises:
a second ferrite plate located behind the second circuit board;
a second metal plate located behind the second ferrite plate; and
a second enclosure having a second clear window, wherein the first coil of the first power transceiver is within a line of sight of the second coil of the second power transceiver.

14. A computing device comprising:
a first housing comprising:
a first power transceiver to receive wirelessly transmitted power from a second power transceiver, wherein the first power transceiver comprises:
a first circuit board comprising a first coil;
a first set of magnets facing outward with a first polarity; and
a first pair of bearings, wherein each bearing of the first pair of bearings is located on either end of the first power transceiver; and
a power bus to distribute power from the first power transceiver to a computer motherboard;
a second housing comprising:
the second power transceiver, wherein the second power transceiver wirelessly transmit power from a power source to the first power transceiver, wherein the second power transceiver comprises:
- a second circuit board comprising a second coil;
- a second set of magnets facing outward with a reverse polarity that has a magnetic attraction to the first set of magnets; and
- a second pair of bearings, wherein each bearing of the second pair of bearings is located on either end of the first power transceiver; and one or more hinges to rotatably couple the first housing to the second housing.

15. The computing device of claim 14, wherein the computer motherboard comprises:
- a graphics processing unit (GPU) comprising a DisplayPort (DP) output connected to a first display device and an embedded DisplayPort (eDP) output connected to a second display device;
- at least one central processing unit (CPU);
- one or more memory storage devices; and
- one or more input/output (I/O) ports.

16. The computing device of claim 14, wherein the magnetic attraction between the first set of magnets and the second set of magnets causes:
- the first power transceiver to rotate within the first pair of bearings;
- the second power transceiver to rotate within the second pair of bearings; and
- the first coil to remain facing the second coil regardless of an orientation of the computing device.

17. The computing device of claim 16, wherein:
the first power transceiver further comprises:
- a first ferrite plate located behind the first circuit board; and
- a first metal plate located behind the first ferrite plate, wherein the first metal plate comprises a copper alloy; and the second power transceiver further comprises:
- a second ferrite plate located behind the second circuit board; and
- a second metal plate located behind the second ferrite plate; and the first metal plate and the second metal plate each comprises a copper alloy.

18. The computing device of claim 14, wherein:
the first housing further comprises:
- a computer motherboard that includes a graphics processing unit (GPU); and
- a first display device connected to an embedded DisplayPort (eDP) output of the GPU; and the second housing further comprises:
- a second display device connected to a DisplayPort (DP) output of the GPU.

19. The computing device of claim 18, wherein the second housing further comprises:
- a battery; and
- a battery charger to:
  - receive power from a source external to the computing device; and
  - charge the battery.

20. The computing device of claim 14, further comprising:
- a first enclosure in which the first power transceiver is enclosed, the first enclosure having a first clear window; and
- a second enclosure in which the second power transceiver is enclosed, the second enclosure having a second clear window to enable the first coil of the first power transceiver to be in a line of sight of the second coil of the second power transceiver.

* * * * *

UNITED STATES PATENT AND TRADEMARK OFFICE
CERTIFICATE OF CORRECTION

PATENT NO. : 10,312,719 B2
APPLICATION NO. : 15/403387
DATED : June 4, 2019
INVENTOR(S) : Jace W. Files, John Trevor Morrison and Gerald R. Pelissier Page 1 of 1

It is certified that error appears in the above-identified patent and that said Letters Patent is hereby corrected as shown below:

In the Claims

Claim 2, Column 17, Line 8, delete the word "the" after the word "transmitted"

Signed and Sealed this
Thirtieth Day of July, 2019

Andrei Iancu
*Director of the United States Patent and Trademark Office*